Oct. 18, 1966   C. G. SIMONS   3,279,431
SELF-DUMPING MOBILE MILKING STATION
Filed Oct. 21, 1964   2 Sheets-Sheet 1
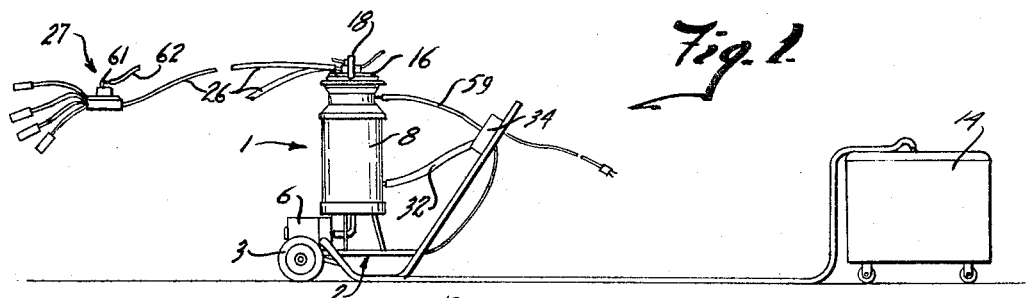
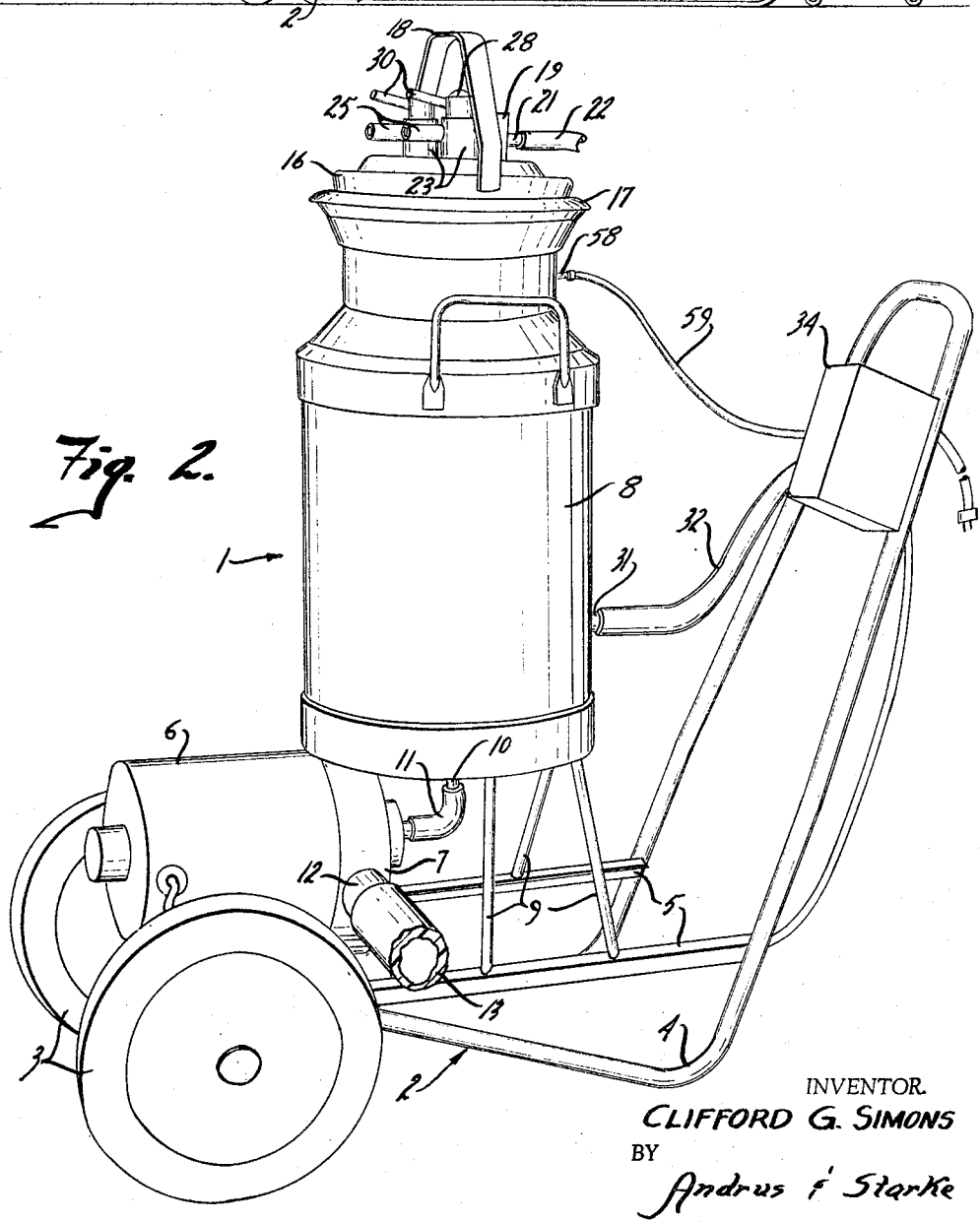
INVENTOR.
CLIFFORD G. SIMONS
BY
Andrus & Starke
Attorneys Oct. 18, 1966  C. G. SIMONS  3,279,431
SELF-DUMPING MOBILE MILKING STATION
Filed Oct. 21, 1964  2 Sheets-Sheet 2
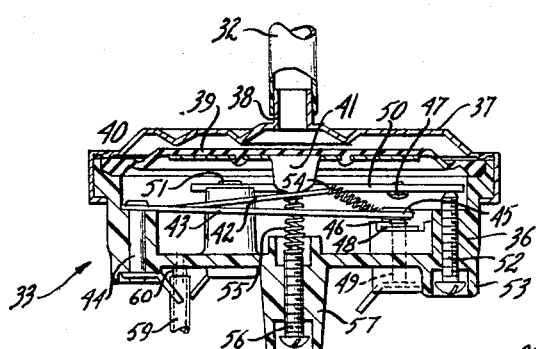
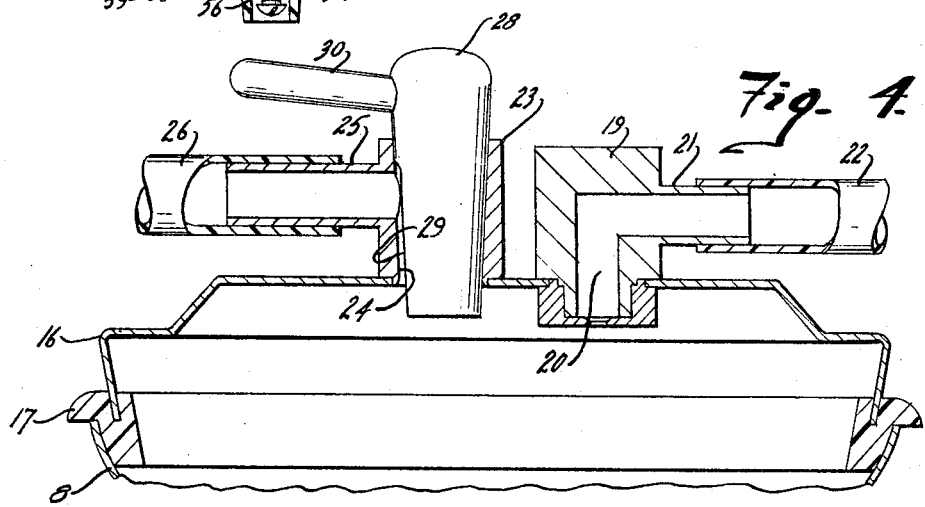
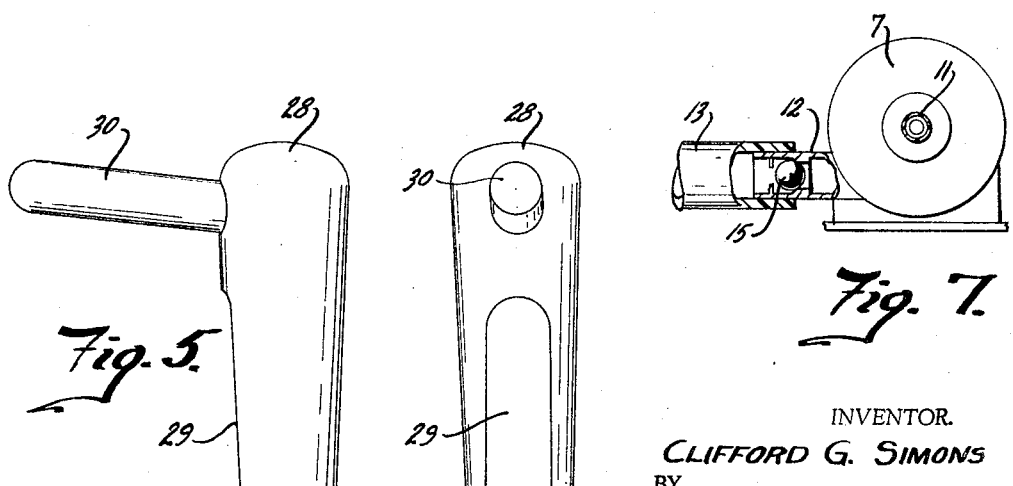
INVENTOR.
CLIFFORD G. SIMONS
BY Andrus & Starke
Attorneys United States Patent Office 3,279,431
Patented Oct. 18, 1966

3,279,431
SELF-DUMPING MOBILE MILKING STATION
Clifford G. Simons, Delavan, Wis., assignor to Sta-Rite Products, Inc., Delavan, Wis., a corporation of Wisconsin
Filed Oct. 21, 1964, Ser. No. 405,337
8 Claims. (Cl. 119—14.08)

This invention relates to an apparatus for conveying liquids and more particularly to a portable pumping station for a milking system.

Many dairy farms are equipped with pipeline milking systems in which the individual milkers are connected to pipe lines which extend through the barn and lead to a bulk storage tank. A pipeline milking system greatly reduces the over-all labor cost in the milking operation, but is a costly installation. In some instances, portable pumping stations are employed which eliminate the costly outlay for piping, but yet, facilitate the handling and conveying of milk to the bulk storage tank. In the conventional portable pumping station, a tank or container is supported on a movable frame and the individual milkers are emptied manually into the container. A pump is also mounted on the frame and pumps the milk from the container through a hose to the bulk storage tank. In most cases the pump is automatically started when the milk rises to a given maximum level in the container and is stopped when the milk recedes to a minimum level. Thus, in the conventional portable pumping station the milk from the individual milkers is manually dumped into the container and then automatically conveyed to the bulk storage tank located in the milk house.

The present invention is directed to an improved pumping station which further reduces the handling of the milk and also eliminates the costly outlay for piping which is necessary with a pipeline milking system. According to the invention, a milk-receiving container is mounted on a movable frame or cart and the outlet of the container is connected to a pump mounted on the cart. The outlet of the pump is connected through a flexible hose or rigid pipeline to a bulk storage tank located in the milk house.

The open upper end of the container is enclosed by a lid which has a series of milk inlet nipples, with each nipple being connected to a milker. In addition, a manifold or pulsator is mounted on the lid and is connected to a vacuum source, which can either be a vacuum pump or a vacuum line, so that the container, as well as the lines to the milkers, are under vacuum. In operation, milk flows from each milker to the container and a pressure-responsive control is employed which automatically starts the pump when the level in the container has reached a given maximum value and shuts the pump off when the level of the milk in the container has receded to a second minimum level.

With this system, no manual handling of milk is required but, instead, the milk is conveyed directly from the individual milking units to the container on the portable pumping station and then to the bulk storage tank without handling. Moreover, the milk from several cows can be run to the container simultaneously, and as the milk is automatically pumped from the container, there is no danger of overflow.

A portable pumping station can be used with milking parlors as well as stanchion barns. With stanchion barns, the unit would be located to the rear of the cow and the individual milkers would be run to the container on the pumping station.

When the unit is used in a milking parlor or stanchion barn it has the advantage of low-line milking due to the fact that the milk is only elevated to the height of the milk-receiving container. In a milking parlor, the portable pumping station is usually in a pit and the milk will flow down hill with the result that vacuum fluctuations are minimized which otherwise may cause irritation to the cow's udder.

The portable pumping station can also be placed in the milk room. In this case, the milk is conveyed from the individual milkers through hoses or conduits to an overhead line which is connected to the milk-receiving container on the portable pumping station located in the milk house.

Other objects and advantages will appear in the course of the following description.

The drawings illustrate the best mode presently contemplated of carrying out the invention.

In the drawings:

FIGURE 1 is a schematic representation of a milking system employing the portable pumping station of the invention;

FIG. 2 is a perspective view of the portable pumping station;

FIG. 3 is a sectional view of the pressure responsive switch mechanism;

FIG. 4 is an enlarged fragmentary vertical section of the container lid;

FIG. 5 is an enlarged side elevation of milk line valve;

FIG. 6 is an end view of the valve shown in FIG. 5; and

FIG. 7 is an end view of the pump with parts broken away in section.

The drawings illustrate a portable pumping unit 1 having a frame 2 provided with wheels 3 which enables the unit to be readily moved across the floor of the barn. The side members of the frame 2 are provided with bends 4 and when the unit is stationary, the bands 4, along with the wheels 3, serve to support the unit on the floor or ground.

A pair of generally horizontal angle braces 5 are connected to the frame 2 and serve to support a motor 6 and pump 7. In addition, a milk-receiving container or receptacle 8 is supported on braces 5 by legs 9 and is located at a level above the pump 7.

The bottom surface of the container 8 is provided with an outlet fitting 10 which is connected to the inlet or suction side of the pump 7 by a hose or conduit 11. The outlet or discharge 12 is connected by a hose 13 to a bulk storage tank 14 or other container in which the milk is to be stored. A conventional check valve, indicated generally by 15, is located in the pump outlet 12 and permits the flow of milk from the pump 7 to the tank 14, but prevents the flow of fluid in the opposite direction and provides a vacuum seal.

The upper end of the container 8 is open and is enclosed by a lid 16 which is sealed to the upper edge of the container by a resilient gasket 17 which is formed of rubber of other resilient material. The lid 16 is not locked to the container 8, for in operation, the container is under vacuum so that atmospheric pressure will serve to hold the lid 16 tightly against the upper edge of the container. A carrying handle 18 extends upwardly from the lid.

To vacuumize the container 8, a manifold block 19, or, alternately, a pulsator, is mounted on the upper surface of the lid and is provided with a passage 20 which communicates with an opening in the lid. A nipple 21 extends outwardly from the manifold and is connected with the passage 20. Nipple 21 is attached to a hose 22 which extends to a suitable source of vacuum. The vacuum source can either be a vacuum pump or a vacuum line which extends overhead within the barn.

A pair of spigots 23 are also mounted on the lid 16 and each spigot is provided with a central opening 24 which communicates with an opening in the lid. A nipple 25 extends outwardly from each spigot and is adapted to be connected by a hose 26 to a milker indicated generally by 27. With this structure, the milk from the milker will flow through the hose 26, nipple 25 and spigot 23 to the interior of the container 8.

Each spigot 23 can be closed off by a rotary valve member 28 and is located within the openings 24 in each spigot 23. Each valve member 28 is provided with a peripheral recess 29 and by rotating the valve member, the recess 29 can be brought in alignment with the nipple 25 to thereby permit milk to flow from the milker to the container 8. As the container 8, as well as the milkers, are under vacuum, the valves 28 enable the unit to be selectively connected to one or two milkers. If only one milker is utilized, the spigot 23, not being used, can be closed off by valve 28 so that the vacuum will be retained. The valve members 28 are adapted to be rotated within the openings 24 by levers 30 which extend outwardly from the upper end of each valve.

To automatically control the milk level in the container 7, the lower portion of the container is provided with an outlet nipple 31 and a tube 32 is connected to the nipple 31 and extends along the outside of the container 8 and is operably connected to a pressure responsive switch mechanism 33 contained within a housing 34 mounted on frame 2. The tube 32 is normally filled with air and as the liquid level rises within the container, the air within the tube 32 is compressed. The increase in pressure of the air within tube 32 serves to actuate the pump motor 6 through switch mechanism 33.

The pressure responsive switch mechanism 33 is a conventional type and is shown in copending application Serial No. 156,833 filed December 4, 1961, now Patent No. 3,198,122, entitled Portable Pumping Station. The switch mechanism includes an outer casing 36 having an open end which is enclosed by a cover 37. A nipple 38 is secured within the central opening in the cover and is connected to the tube 32. A flexible diaphragm 39, or other pressure responsive member, is secured across the casing 36 and is stiffened by a plate 40 which is secured to the central portion of the diaphragm. The plate 40 carries a fin-like projection 41 which extends through a slot in the central arm 42 of the snap switch 43. One end of the switch 43 is connected to a terminal 44 which the other end of the switch is provided with a contact 45 which moves between two stationary contacts 46 and 47. In the illustrated device, the contact 46 is dead and is secured to one end of a lower contact arm 48 and the other end of the arm 48 is secured to a terminal 49. The contact 47 which is a live contact is secured to one end of an upper contact arm 50 and the opposite end of the arm 50 is connected to a terminal 51. The terminal 44 is connected to a suitable source of electrical power, while the terminal 51 is connected to the pump motor 6.

The position of the upper contact 47 can be adjusted by means of a set screw 52 which is threadedly engaged with a boss 53 in the casing. By threading the screw inwardly the distance between the contacts 46 and 47 will be increased.

A coil spring 54 connects the end of the central arm 42 with a contact 45 and serves to provide a snap action for the switch 43. A further adjustment is provided by coil spring 55 which engages the tip of the projection 41. The other end of the spring is threaded within the boss 57. The adjustment provided by the bolt 56 enables the switch element 43 to return to the contact 46 at a different pressure value than that which is required to move the switch from contact 46 to contact 47.

To equalize the pressure on either side of the diaphragm 39, a nipple 58 is secured to the upper portion of the container 8 and is connected by tube 59 to a nipple 60 in casing 36. The pressure equalizing tube 59 has a substantially smaller cross sectional area than the tube 32.

To begin operation, the hose 22 is connected to the vacuum line and the pulsator 61, which is normally associated with the milker 27, is also connected to the vacuum line by line 62. During operation of the system, milk is drawn through the hose 26 from each individual milker 27 and into the container 8. As the milk rises within the container, the air within the larger diameter hose 32 is compressed, and the increase in pressure causes the diaphragm to flex. When the pressure builds up to a predetermined value, contact 45 of switch 43 will snap into engagement with contact 47 thereby completing the circuit to the pump motor 6 and starting the pump 7. Operation of the pump will lower the liquid level within the container 8 and as the liquid level lowers, the pressure within the tube 32 will decrease. When the pressure within the tube reaches a second predetermined value, which is less than the pressure required to start the pump, the contact 45 of switch 43 will snap into engagement with the dead contact 43 to stop the pump. In most cases, the minimum level at which the pump will operate is generally above the level of the outlet nipple 31. However, it is not essential that the minimum liquid level be above the nipple 31.

The tube 59 serves as a pressure equalizer so that the vacuum felt on each side of the diaphragm 39 of the pressure switch is constant and the level of the milk in the can will always actuate the pressure switch at the same level. This compensates for any variations of vacuum. For example, if a milker 27 should drop off the cow so that the vacuum is nil, this effect is equalized on both sides of the diaphragm so that the differential is maintained. It is important that the tube 32 be of a substantially greater cross sectional area that the equalizing tube 59 so that there is a sufficient pressure differential to actuate the pressure responsive switch 33.

The present invention provides a system for directly conveying the milk from the milker to the bulk storage tank without the costly installation of pipelines which are normally necessary in a pipeline milking system. By use of the several spigots 23 the milk from several cows can be conveyed to the container 8 at the same time. While two such spigots were shown, it is contemplated that several can be used if desired.

Moreover, it is contemplated that the container 8 and lid 16 can be an integral, one-piece unit rather than including a separate lid as shown in the drawings.

The portable pumping station can be used with milking parlors or in stanchion barns and has the advantage of low-line milking since the milk need only be elevated to the height of the milk receiving container or can 8 and not to the height of the elevated pipeline, as in the case of the conventional pipeline milking system.

Various modes of carrying out the invention are contemplated as being within the scope of the following claims particularly pointing out and distinctly claiming the subject matter which is regarded as the invention.

I claim:

1. A portable pumping station for a milking system, comprising a movable frame, a closed container mounted on the frame and having an inlet opening adapted to be connected to a milking device and having an outlet opening in the bottom portion thereof, means associated with the upper portion of said container for creating a vacuum in said container, a motor driven pump mounted on the frame, first conduit means connecting the outlet of the container with the inlet of the pump, the outlet of the pump adapted to be connected to a bulk storage tank, pressure responsive switch means operably connected to the motor of the pump and including a pressure responsive member, an air tube having one end communicating with the container at a location above said outlet and having the other end communicating with one face of the pressure responsive member, said switch means being responsive to a first pressure in said air tube for starting the motor when the milk rises to a predetermined first level in the container and responsive to a second pressure in the air tube for stopping the motor after the milk level is lowered to a predetermined second level in the container, and a second air tube having one end communicating with the upper end of the container and the opposite end communicating with the pressure responsive member whereby the vacuum in said container is applied to both faces of the pressure responsive member.

2. The structure of claim 1 in which the cross sectional area of the first air tube is substantially greater than the cross sectional area of the second air tube.

3. The structure of claim 1, in which the second air tube communicates with the container at a level above said predetermined first level.

4. The structure of claim 1 in which the pressure responsive member is a diaphragm and the switch means includes a switch member operably connected to the diaphragm and adapted to be opened and closed by movement of the diaphragm.

5. A portable pumping station for a milking system, comprising a movable frame, a container mounted on the frame and having an open upper end and having an outlet opening in the bottom portion thereof, pumping means mounted on the frame with the inlet to the pumping means being connected to the outlet of said container, a lid enclosing the open upper end of the container, means associated with the lid for creating a vacuum in said container, a plurality of members connected to the lid with each member having a milk receiving passage, one end of each passage being connected by a flexible tube to a separate milking device and the other end of each passage communicating with the interior of the container, valve means associated with each passage for independently opening and closing each passage, and pressure discriminating switch means operably connected to said pumping means and responsive to the level of milk in said container for starting said pumping means when the milk level rises to a predetermined level in the container and for stopping the pumping means when the milk level recedes to a second predetermined level in said container.

6. In a milking system, a movable milk-receiving station including a milk receiving container and pumping means, said container having an open upper end and having an outlet opening in the bottom portion thereof, first conduit means connecting the outlet of the container to the outlet of the container to the inlet of the pumping means, a lid enclosing the open upper end of the container, means associated with the lid for creating a vacuum in said container, a plurality of members connected to the lid with each member having a milk receiving passage, one end of each passage communicating with the interior of said container, a plurality of milking devices, second flexible conduit means connecting the opposite end of each passage with a separate milking device, valve means associated with each passage for independently opening and closing said passage, a bulk storage tank, third flexible conduit means connecting the outlet of the pumping means with the bulk storage tank, check valve means in said third conduit means for permitting flow of milk from said pumping means to the bulk storage tank and for preventing flow of fluid in the opposite direction, pressure discriminating switch means operably connected to said pumping means and responsive to the level of milk in said container for starting said pumping means when the milk level rises to a predetermined level in the container and for stopping the pumping means when the milk level recedes to a second predetermined level in said container.

7. A portable milking station, comprising a movable frame, a container mounted on the frame and having an outlet opening in the bottom portion thereof and having an inlet opening in the upper portion thereof, pumping means mounted on the frame with the inlet to the pumping means being connected to the outlet of said container, a first flexible conduit connecting the outlet of the pump to a bulk storage tank, a milking apparatus including a plurality of teat cup assemblies and a milk-receiving chamber communicating with said teat cup assemblies, a second flexible conduit connected between the milk receiving chamber and the inlet of the container, means for creating a vacuum in said container and in said chamber, and pressure discriminating switch means operably connected to said pumping means and responsive to the level of milk in said container for starting the pumping means when the milk level rises to a predetermined level in the container and for stopping the pumping means when the milk level recedes to a second predetermined level in said container.

8. A portable milking station, comprising a frame, wheel means mounted on the frame, a container mounted on the frame and having an outlet opening in the bottom portion thereof, a pump mounted on the frame with the inlet to the pump being connected to the outlet of the container, first flexible conduit means connecting the outlet of the pump to a bulk storage tank, a plurality of tubular members secured within openings in the wall of the container with each tubular member defining a milk receiving passage, a second flexible conduit connecting each passage to a separate milking device, separate valve means connected to each tubular member for independently opening and closing each passage, means for creating a vacuum in said container, and pressure discriminating switch means operably connected to said pump and responsive to the level of milk in the container for starting the pump when the milk level rises to a predetermined level in the container and for stopping the pump when the milk level recedes to a second predetermined level in said container.

References Cited by the Examiner
UNITED STATES PATENTS

| | | | |
|---|---|---|---|
| 1,987,466 | 1/1935 | Collin | 103—25 |
| 2,102,304 | 12/1937 | Charbonneau | 103—25 X |
| 2,361,970 | 11/1944 | Schmitt | 119—14.11 |
| 2,791,964 | 5/1957 | Reeve | 119—14.05 X |
| 2,808,025 | 10/1957 | Graves | 119—14.18 X |
| 2,878,819 | 3/1959 | Thomas | 119—14.18 X |
| 3,053,225 | 9/1962 | Babson | 119—14.11 |
| 3,088,483 | 5/1963 | Brunson | 137—355.12 |
| 3,198,122 | 8/1965 | Lippke et al. | 103—25 |

SAMUEL KOREN, *Primary Examiner.*

A. F. MEDBERY, *Assistant Examiner.*